United States Patent
Fogg

Patent Number: 6,038,578
Date of Patent: Mar. 14, 2000

[54] METHOD AND SYSTEM FOR GENERATING A SERIES OF WAVEFORM DEFINITIONS

[76] Inventor: Harold T. Fogg, 15592 E. Batavia Dr., Aurora, Colo. 80011

[21] Appl. No.: 07/616,586

[22] Filed: Nov. 21, 1990

[51] Int. Cl.[7] ................................................. G06F 1/02
[52] U.S. Cl. ............................................................ 708/270
[58] Field of Search .............................. 395/800; 364/487, 364/718; 708/270, 271, 272, 273; 702/66, 67, 68; 324/76.12, 76.16

[56] References Cited

U.S. PATENT DOCUMENTS

| | | | |
|---|---|---|---|
| 4,255,790 | 3/1981 | Hondeghem | 364/487 |
| 4,667,302 | 5/1987 | Mackey et al. | 364/718 |
| 4,701,871 | 10/1987 | Sasaki et al. | 364/718 |
| 4,791,384 | 12/1988 | Mackey et al. | 364/718 |
| 4,956,798 | 9/1990 | Dinteman | 364/718 |
| 5,029,120 | 7/1991 | Brodeur et al. . | |

FOREIGN PATENT DOCUMENTS

WO8604702  8/1986  WIPO ................... 364/487

OTHER PUBLICATIONS

Cantoni, A., "Optimal Curve Fitting with Piecewise Linear Functions," IEEE Transactions on Computers, vol. C-20, No. 1, Jan. 1971, pp. 59–67.

*Primary Examiner*—Richard L. Ellis
*Attorney, Agent, or Firm*—Jones, Day, Reavis & Pogue

[57] ABSTRACT

An initial waveform is defined as a set of amplitude values corresponding to a set of base positions. A series of waveform definitions is generated by incrementing or decrementing at least one amplitude value in the set of amplitude values according to a predetermined counting sequence and in dependence upon the current amplitude values. Waveform definitions are generated until an end condition is reached, such as a predetermined number of waveform definitions having been generated or a predetermined waveform definition having been generated. Waveform definitions can be stored in memory. A single waveform definition or the series of waveform definitions can be stored in memory. A single waveform or the series of waveforms can be plotted or displayed.

28 Claims, 3 Drawing Sheets

METHOD AND SYSTEM FOR GENERATING A SERIES OF WAVEFORM DEFINITIONS

FIELD OF THE INVENTION

This invention relates to the generation, selection and use of a series of waveforms. In particular, this invention relates to the generation of a series of waveforms that may be selected and used to test and calibrate devices which respond to waveform signals.

BACKGROUND OF THE INVENTION

There exist a variety of electronic devices that receive a signal in the form of an analog wave and then process the waveform signal to obtain a desired result. In particular, the devices may monitor the received waveform signals by recording the waveforms. An electrocardiograph, which monitors electrical signals produced by a beating heart, is an example of such a device. Another example is a device that monitors light waves transmitted in an optical fiber. Another example is a voltage monitor that monitors the power transmitted in a wire.

The devices also may monitor the received waveform signals by comparing the waveforms to defined waveforms and producing a desired result when an abnormal waveform is detected. For example, an implanted cardiac pacer produces the stimulating voltage pulse when it detects a heart arrythmia. A heart monitor alerts medical personnel in the same event.

A waveform signal monitor that does not function properly can cause serious consequences. An improperly functioning biological waveform signal monitor, such as an electrocardiograph, cardiac pacer or heart monitor, can be fatal. Therefore, devices have been developed to test and calibrate waveform signal monitors. These devices produce waveform signals that simulate signals that are expected to be monitored.

A typical waveform signal simulator device contains several digitized waveforms in non-volatile memory such as a ROM. Upon a request a digitized waveform is recalled from memory and processed through a digital/analog convertor. The resulting analog waveform signal then is sent to the monitor to be tested or calibrated. The monitor's response to a known waveform or series of waveforms then can be observed.

Present waveform signal simulators contain one or relatively few digitized waveforms in non-volatile memory. The digitized waveforms will vary according to the anticipated use of the simulator. For example, a simulator for use with a cardiac pacer or electrocardiograph may contain an R-wave and several common arrythmia waveforms. A simulator for use with an optical fiber transmission monitor may contain backscatter waveforms associated with several common imperfections in the fiber.

A simulator can be manufactured with a few digitized waveforms permanently placed in non-volatile memory. Such a simulator is greatly limited because it can only produce the few waveform signals that are defined when the simulator is manufactured. Alternatively, a simulator can be manufactured to receive a removable cartridge that contains a few digitized waveforms in non-volatile memory. Such a simulator is less limited because a theoretically infinite number of cartridges can be used with the simulator. However, the number of waveform signals that such a simulator can produce at any given time is limited by the number of cartridges the simulator can receive at one time and by the number of waveforms that can be placed in each cartridge.

Regardless of the method by which digitized waveforms are provided in a simulator, there remains the problem of defining the waveforms to be provided. As mentioned above, a waveform signal simulator typically is intended to be used with a particular type of monitor. Therefore, the common waveform signals expected to be detected by a particular monitor will be provided in the associated waveform signal simulator. However, there is no systemized method by which new, uncommon or non-existent waveforms are defined and provided to waveform signal simulators.

In the prior art, when the user of a waveform signal simulator desired to use an undefined waveform, the user would send a drawing of the waveform to the simulator manufacturer. The simulator manufacturer would digitized the waveform and place the digitized waveform in non-volatile memory. The simulator manufacturer then would send to the user a simulator or a cartridge that contained the digitized waveform in non-volatile memory.

In some cases, the simulator user may have defined the desired waveform with a series of data points representing amplitude along a time axis. In these cases the simulator manufacturer merely has to place the defined waveform into non-volatile memory.

The difficulty with prior art methods is that the simulator user must either accept only a few common waveforms provided with the simulator or be able to give to the simulator manufacturer a drawing or definition of a desired but previously undefined waveform. There exists a need for a system allowing the user to select from a large variety of possible waveforms in resident memory rather than independently developing those waveforms.

SUMMARY OF THE INVENTION

The present invention utilizes a series of waveforms that may be utilized with a simulator. The waveform series is generated and displayed in such a way that a pattern is visually apparent, enabling the user to select certain waveforms from the series. Because the waveforms in the series already are defined, the selected waveforms may be provided more quickly and with less expense than previously possible. The waveforms may be provided in non-volatile memory, as in the prior art. The waveforms also may be selected and immediately generated by including computing means in the simulator.

DETAILED DESCRIPTION OF THE PREFERRED EMBODIMENT

Figure 1:
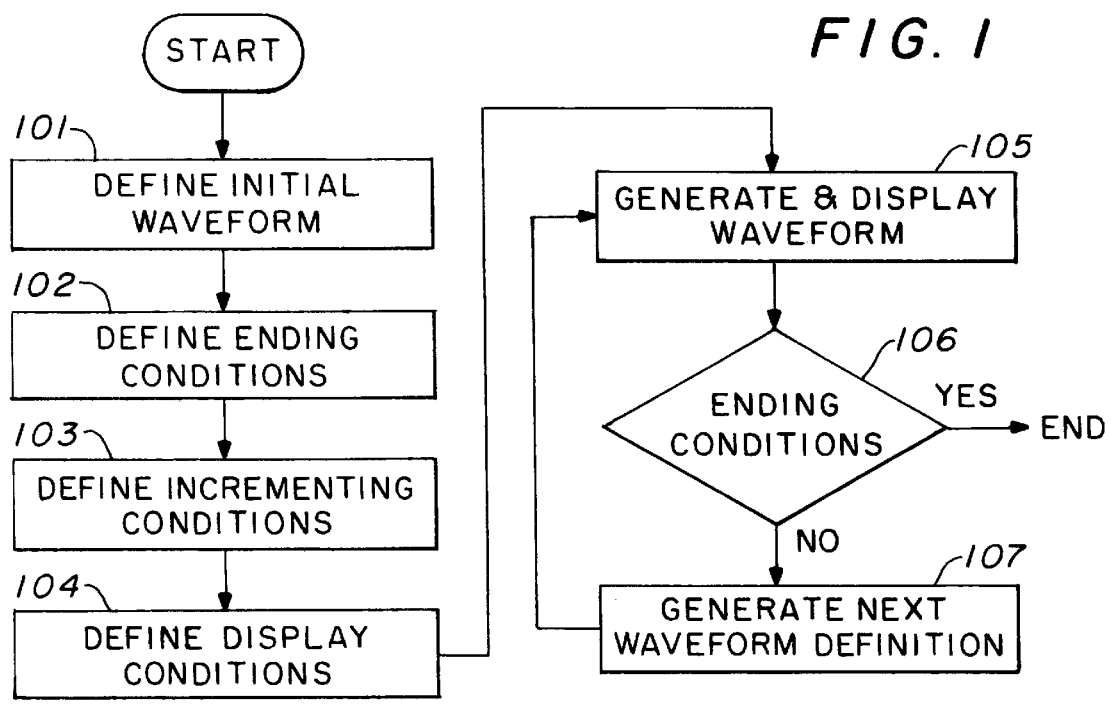
FIG. 1 is a block diagram of the waveform generation method of the present invention.

FIG. 1 is a block diagram of the waveform generation method of the present invention. Individual steps in the method are discussed in detail later in the detailed description. FIG. 1 is intended solely to give a general overview of the method.

As shown in FIG. 1, an initial waveform and set of operating conditions are defined. In step 101 an initial waveform is defined. An ending condition is then defined in step 102. The ending condition may be the occurrence of a pre-determined event, such as the generation of a pre-determined waveform definition or the generation of a pre-determined number of waveform definitions, or it may be a signal provided by the user of the waveform generator. The incrementing conditions, or counting sequence, are defined in step 103. The display conditions are next defined in step 104.

Figure 2:
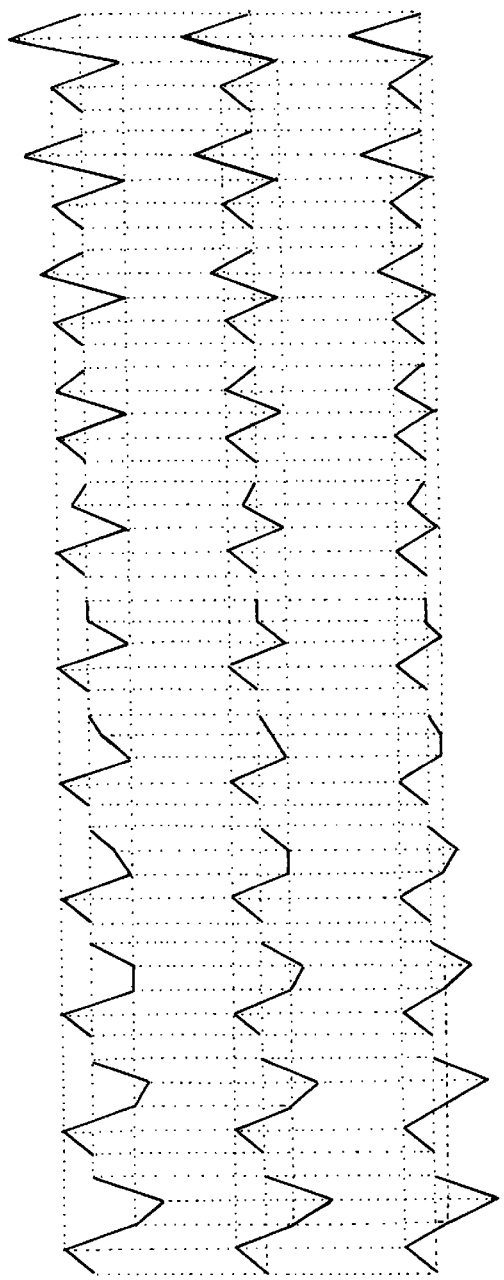
FIG. 2 is a series of waveforms generated by the method using conventional counting.

A waveform is generated from its definition and displayed in step 105. If an ending condition is not reached in step 106, the waveform definition is incremented in step 107 by reference to the incrementing conditions of step 103, generating the next waveform definition in the series. A waveform is generated from each waveform definition and displayed in turn. New waveform definitions are produced by successive increments until the process is terminated upon reaching an ending condition. A series of waveforms whose definitions were generated by the method of the present invention are shown in FIG. 2.

Figure 3:
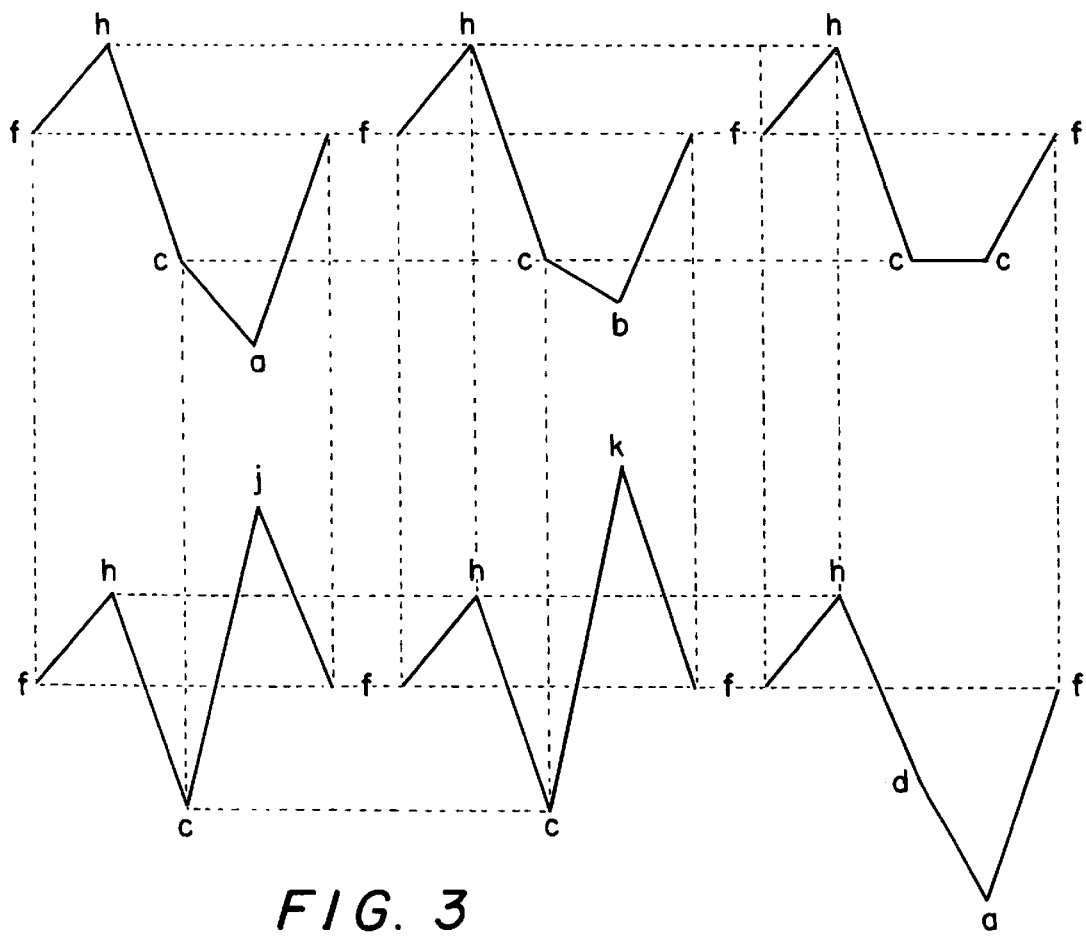
FIG. 3 is a detailed depiction of several waveforms from the series illustrated in FIG. 2, with the letters that define each waveform located adjacent the corresponding defined amplitudes.

Several waveforms and their corresponding definitions are shown in FIG. 3. The waveforms are expressed as values of one quantity (in arbitrary units) at values of a related quantity (in arbitrary units) in an X-Y, or two-dimensional, Cartesian coordinate system. In the preferred embodiment waveforms are expressed as amplitude against base. The values of amplitude are measured on the Cartesian Y-axis and the values of base are measured on the Cartesian X-axis.

A waveform may express a relationship between any two varying related quantities. The values of amplitude and base will be expressed in units of the two varying related quantities. The amplitude is expressed in units, indicated on the amplitude axis, from the base axis. Similarly, the base is expressed in units, indicated on the base axis, from the amplitude axis.

The units of amplitude and base will vary depending upon the application. For example, waveforms defined for electrical applications may have amplitude units of electric potential or current, such as millivolts, microvolts or milliamperes, and base units of time, such as milliseconds. In other applications waveforms can have amplitude and base units such as flow and volume, flow and pressure, volume and pressure, output voltage and input voltage, or depth and distance, respectively.

It will be appreciated that using the singular term "unit" does not imply that each unit is a single multiple of the value represented. For example, if the amplitude axis represents millivoltage each amplitude unit may represent one millivolt, five millivolts or three-quarters of a millivolt. Therefore, three amplitude units may represent three, fifteen, or two and one-quarter millivolts, depending upon the definition of a "unit".

As shown in FIG. 3, a waveform is defined by a series of characters. Each character describes an attribute of the waveform. In the preferred embodiment the most commonly used character is an English letter. A letter describes the amplitude of a waveform at a point on the base axis.

A lower case letter describes an amplitude a certain number of units from the base axis. An upper case letter describes an amplitude one-half unit greater than the corresponding lower case letter. Thus, "b" is one unit greater than "a", and "A" is between "a" and "b", one-half unit from each. Therefore, in the preferred embodiment fifty-two amplitudes from "a" to "Z" may be described, a range of twenty-five and one-half units, measured in one-half unit increments. It may be desired to use only lower case letters, allowing for the description of twenty-six amplitudes from "a" to "z", a range of twenty-five units in whole unit increments.

The use of lower case letters instead of digits to represent amplitude converts the amplitude from a base ten counting system (0,1,2, . . . 7,8,9) to a base twenty-six counting system (a,b,c, . . . x,y,z). The use of both lower and upper case letters creates a base fifty-two counting system (a,A,b,B, . . . x,X,y,Y,z,Z). It will be understood that the word "base" to describe a counting system, as in "base ten", has a different meaning from and should not be confused with the word "base" to describe the waveform quantity measured along the base axis, or the x-axis.

Letters are chosen to describe a waveform amplitude for ease of use while providing for more than ten possible amplitudes at a point on the base axis. It has been observed that initially it is difficult for a person to use a counting system that is not base ten. For example, a base sixteen counting system frequently is used in computer programming because of the binary operation of microprocessors. It is difficult for a novice to understand that base sixteen "3d" is equal to base ten "61". The novice is confused because the base sixteen counting system combines symbols (the ten digits) that are commonly used for the base ten counting system with symbols (the first six letters of the English alphabet) that are not commonly used for counting.

Using the English alphabet as a counting system creates a counting system with a larger base (twenty-six or fifty-two) that uses symbols with which people are familiar. Every literate English-speaking person is familiar with the English alphabet. The letters are in a familiar defined order. Therefore, it is almost as natural for a person to count by "a,b,c,d, . . . " as it is to count by "1,2,3,4, . . . ".

In the preferred embodiment, the letter "a" is defined to be the least amplitude. Each lower case letter describes an amplitude greater than "a" by a multiple of units equal to the letter's place after "a" in the alphabet. Thus, "d" describes an amplitude three units greater than amplitude "a". In the preferred embodiment, then, amplitude "A" is one-half unit above amplitude "a", amplitude "b" is one unit above amplitude "a", amplitude "B" is one and one-half unit above amplitude "a", and so on.

In an alternate embodiment of the invention, the amplitude points may be defined only by lower case letters. In this embodiment, "a" defines the least amplitude, and the other letters in turn represent greater amplitudes in whole units. The available amplitudes thus are "a" to "z".

In another alternate embodiment of the invention, the entire available range of amplitudes is not defined. For example, a range of only "a" to "k" may be defined. This alternate embodiment may be combined with the just-described alternate embodiment, so that an amplitude range of only lower case letters is defined, such as: "a,b,c,d,e,f,g,h,i,j,k".

For general use, it is desirable to place the middle of a defined amplitude range at the base axis. For example, if the amplitude range is defined as all lower and upper case letters, amplitude "M" can be placed at the base axis. Thus, twenty-six amplitudes ("n" up to "Z") are above the base axis and twenty-five amplitudes ("m" down to "a") are below the base axis. However, it may be desirable to place the defined amplitude range at other locations with respect to the base axis. For example, if waveforms with no negative amplitudes are to be defined, amplitude "a" can be placed at the base axis so that fifty-one amplitudes are above the base axis. Similarly, a range of defined amplitudes may be adjusted with respect to the base axis in response to an offset in the waveform being defined, as when a DC voltage offset is added to a waveform representing voltage against time. Further, the base axis may be defined to be a value other than zero. Defining the base to be a non-zero value has the effect of moving the entire waveform up or down in amplitude value. Such an effect may be desired when calibrating equipment.

It will be apparent that a specific amplitude definition may be used for a specific application. For example, many waveform types have positive amplitudes that are much greater than their negative amplitudes. An example of this is the set of blood pressure waveforms produced by a beating heart. The positive amplitudes of blood pressure waveforms usually are much greater than the negative amplitudes. A definition for blood pressure waveforms may define a range of amplitudes from "a" to "z", where each amplitude unit represents ten pressure units. Thus, a range of 250 pressure units is defined. However, amplitude "c" may be placed at the base axis to account for the disparity in range between positive and negative amplitudes. This definition would define a pressure range of –20 to 230 pressure units.

It is anticipated that providing fifty-two discrete amplitude definitions will allow sufficient resolution accuracy for a desired waveform. However, if a particular waveform definition requires an amplitude at a point from the base axis that is not at a multiple of one-half units from the base axis a particular amplitude may be defined. A particular amplitude may be defined numerically by placing the amplitude value in decimal units between brackets. For example, an amplitude between "g" (six units above the base axis) and "G" (six and one-half units) may be defined as "[6.3]" or "[6.29807]".

There also may be waveforms where it is difficult or not desirable to define an amplitude at every point on the base axis. In general, amplitude points may be omitted whenever a straight line is desired between two points that are not adjacent on the base axis. An omitted amplitude point is indicated by a dash or hyphen: "-". Five omitted amplitude points are indicated by an equal sign: "=". For example, a triangle wave comprises three essential amplitudes: the beginning amplitude (typically zero amplitude), the peak amplitude, and the ending amplitude (typically zero amplitude). The three amplitude points are connected by two straight lines. It is possible to define amplitude points along the straight lines. However, it is much easier to omit the amplitude points between the three essential amplitudes and allow the curve defining portion of the waveform generation method to insert a straight line. A symmetrical triangle wave that begins and ends at the base axis, has a peak amplitude of positive ten units, and has a period of six units is defined as "a--k--a". The same triangle wave with a period of twelve units may be defined as "a-----k-----a" or "a=k=a".

The choices of a dash and an equal sign to represent omitted amplitude definitions are purely one of convenience. The symbols are somewhat related, the equal sign containing one dash placed upon another dash, suggesting they represent related concepts. The symbols also are proximately located on a standard keyboard and may be typed without using a shift key, increasing input speed. However, almost any symbols except those already used in the waveform definitions may represent omitted amplitude points.

The base axis units may vary depending upon the frequency of the waveform used in a particular application. For example, a waveform with a time base and a low frequency, such as an R-wave, may only require an amplitude definition every ten milliseconds for a reasonably accurate waveform definition. Typically, however, an accurate as possible waveform definition will be desired—that is, the base axis units should represent as small base increments as possible.

If the base units are in units of time, the units are constrained by the physical limitations of the equipment that will produce the waveform output. In the preferred embodiment, the waveform generation method and system is used with a common commercially available microprocessor, such as an Intel 80286 or Intel 80386. The clock speed of such microprocessors is around 12–33 MHz. Thus, an amplitude point may be defined approximately every 50 nanoseconds.

This constraint is of practical significance when the base units are in time because a waveform expressing amplitude against time typically is used in real time applications. As a simple example, if a defined heartbeat waveform's amplitudes are defined against milliseconds but the amplitudes can be processed only every tenth of a second, the simulated heartbeat waveform will appear elongated by two magnitudes on a display. Physical constraints on the minimum base unit that may be defined also affect the error found in a waveform produced from a digitized waveform. For example, it is well known in the art that increasing samples in a given period reduces output error in a D/A converter. Reducing the base unit effectively increases the sample rate and reduces output error.

As processing speeds become greater the base units may become correspondingly smaller. In the preferred embodiment, the use of a math coprocessor, such as an Intel 80287 or Intel 80387, will increase the processing speed and reduce the minimum base unit. Parallel processing techniques and other specialized equipment similarly will increase the processing speed and decrease the minimum base unit.

If a particular waveform definition requires an amplitude definition at a point on the base axis that is not an integral multiple of the base unit a particular base interval may be defined. A particular base interval is defined as a partial base unit from the preceding base unit. A partial base unit is expressed as a decimal percentage of a whole unit but with the leading decimal point omitted. Thus, three-quarters of a unit, or 0.75 unit, is expressed as "75". For example, a triangle wave that begins and ends at amplitude "a", has a peak amplitude of amplitude "k" (or ten units above "a"), has a period of one unit (or one millisecond), reaches its peak in 0.3 base units (or 0.3 milliseconds), and returns to amplitude "a" in 0.7 base units is defined as "a3k7a".

The partial base unit may contain additional decimal places up to the physical limitation of the apparatus. For example, the triangle wave defined above may be more accurately defined as "a34508k65492a", where the peak is reached in 0.34508 base units. As another example, a triangle wave with two unequal peaks within one base unit may be defined as "a15k25c2m4a". This waveform begins at amplitude "a", reaches the first peak of amplitude "k" at 0.15 base units, goes down to an intermediate minimum of amplitude "c" at 0.4 base units, reaches the second peak of twelve amplitude units at 0.6 base units, and ends at amplitude "a" at one base unit.

Where an amplitude point is to be defined at a partial base unit it may be desired to place the next amplitude point one base unit from the amplitude point at the partial base unit. Thus, a triangle wave may be defined as "a3ka". The waveform begins at amplitude "a", reaches the peak of amplitude "k" in 0.3 base units, and then slopes down to amplitude "a" in one base unit. The entire period of the triangle wave is 1.3 base units.

A partial base unit definition is particularly useful for defining square waves and impulse waves. For these waveforms the partial base unit is defined as zero. For example, a square wave that begins and ends on the base axis, has a peak amplitude of ten units, and remains at the peak for two base units is defined as "a0kkk0a". A impulse wave of ten amplitude units may be defined as "a0k0a".

The waveform series generation method begins with an initial waveform definition. The next waveform definition in the series is generated by incrementing the initial definition. As an example to be used in the preferred embodiment, the waveform definition "fhcaf" will be the initial waveform definition. The amplitude range is defined as lower case letters from "a" to "k", where "f" is located at the base axis. In all series described in the preferred embodiment the end amplitude points of the definitions will remain at "f", or on the base axis. In using the waveform series it is preferable to have all waveforms begin and end on the base axis so that several waveforms may be selected and connected at a common amplitude.

A definition is incremented by counting incrementally from the definition as if the definition were a number. Different counting schemes will produce different series from the same initial definition. Two counting schemes will be described in the preferred embodiment, although it will be appreciated that any counting scheme may be employed.

The first counting scheme is called "conventional" counting. This is the sequential counting scheme commonly used to count any series of items. Applied to numbers, conventional counting produces the series:

```
00000
00001
00002
.
.
.
00007
00008
00009
00010
00011
00012
.
.
.
00017
00018
00019
00020
00021
00022
.
.
.
```

Applied to the initial waveform definition, "fhcaf", conventional counting produces the series:

```
fhcaf
fhcbf
fhccf
```

-continued

```
.
.
.
fhcif
fhcjf
fhckf
fhdaf
fhdbf
fhdcf
.
.
.
fhdif
fhdjf
fhdkf
fheaf
fhebf
fhecf
.
.
.
```

A portion of this series of waveforms is shown in FIG. 2. Two smaller portions of this series of waveforms and their corresponding definitions are shown in FIG. 3. In FIG. 2, it is apparent visually that the conventional counting scheme produces a series of waveforms with sharp breaks when a maximum amplitude point at a base axis unit is incremented to a minimum amplitude point at that unit. The break occurs between the right end of a row and the left end of the next row below. As shown in detail in the bottom row of FIG. 3, when "fhckf" is incremented to "fhdaf" the amplitude at four units along the base axis increments from "k" to "a", or from five amplitude units above the base axis to five amplitude units below the base axis. This break also occurs between the right end of the top row and the left end of the middle row of FIG. 2.

A visually smoother series of waveforms is generated through incrementing the definitions by "least increment" counting. In least increment counting when an amplitude at a particular base unit has reached its maximum the waveform definition is incremented by increasing the left adjacent amplitude to the next greater value. Then the maximum amplitude at the particular base unit is decreased to the next smaller value. The amplitude at the particular base unit decreases until the minimum value is reached. Then the definition is incremented as in conventional counting until another maximum amplitude is reached.

Consider the earlier example, "fhckf". In conventional counting the definition is incremented to "fhdaf". The amplitude at three base units, "c", is increased to the next greater amplitude, "d". The amplitude at four base units, "k", is decreased to the minimum value, "a".

In least increment counting "fhckf" is incremented to "fhdkf" and then to "fhdjf". The amplitude at three base units is increased to the next greater amplitude, as in conventional counting. However, in least increment counting the maximum amplitude is not changed. In the next increment the amplitude at four base units is decreased to the next smaller value, "j". The amplitude at four base units then decreases until it reaches the minimum value, "a", as shown in the bottom row of FIG. 5. The definition then is "fhdaf". The definition then is incremented by increasing the amplitude at three base units, to "fheaf", and proceeding as in conventional counting, to "fhebf", "fhecf", and so on.

Least increment counting is best shown by its application to numbers:

```
00000
00001
00002
  .
  .
  .
00007
00008
00009
00019
00018
00017
  .
  .
  .
00012
00011
00010
00020
00021
00022
  .
  .
  .
```

As shown in the above series, least increment counting increments a number by changing the value of a single digit by one, or some other predetermined increment. This counting scheme applied to the waveform definition of the present invention avoids the sharp breaks visually apparent in conventional counting series because the amplitude at any given base unit never changes by more than one amplitude unit when a definition is incremented.

Applied to the initial waveform definition, "fhcaf", least increment counting produces the series:

```
fhcaf
fhcbf
fhccf
  .
  .
  .
fhcif
fhcjf
fhckf
fhdkf
fhdjf
fhdif
  .
  .
  .
fhdcf
fhdbf
fhdaf
fheaf
fhebf
fhecf
  .
  .
  .
```

Figure 5:
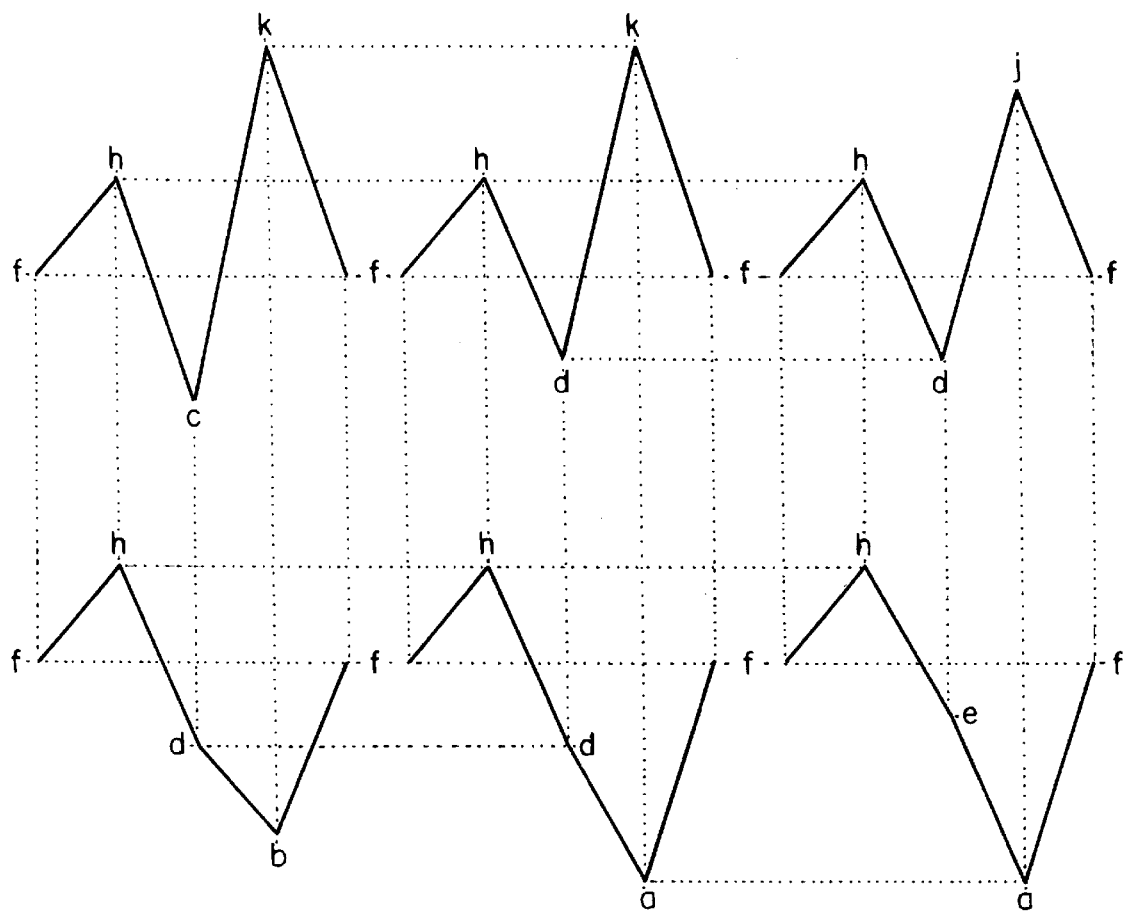
FIG. 5 is another series of waveforms generated by the method using least increment counting.

Two portions of this series of waveform definitions are shown graphically in FIG. 5. The top row of FIG. 5 should be compared with the bottom row of FIG. 3. Both show increments of the definition "fhckf". In FIG. 5 the definition increments to "fhdkf" and then to "fhdjf". In FIG. 3 the definition increments to "fhdaf" and then to "fhdbf". It is apparent visually that the series of waveform definitions in FIG. 5 produces a visually "smoother" series.

The series in the top row of FIG. 5 also illustrates that in least increment counting a waveform definition can be incremented by incrementally decreasing the value of an amplitude at a point on the base axis. This is illustrated where "fhdkf" is incremented to "fhdjf", and the amplitude at four units along the base axis increments from "k" to "j". The series in the bottom row of FIG. 5 illustrates that in least increment counting when a minimum amplitude value is encountered the definition is incremented as in conventional counting.

The waveform definitions are incremented until the leftmost character has been incremented to its maximum value. At that point, a new character is added to the left end of the definition, and the definition grows in this fashion until a pre-determined length is reached. A short waveform definition incremented by least increment counting illustrates the process:

```
aaa
aba
aca
 .
 .
 .
axa
aya
aza
aaza
abza
abya
abxa
 .
 .
 .
```

Note that in the preferred embodiment a waveform defined with omitted amplitude points, such as the previously mentioned triangle wave, "a--k--a", produces a waveform series with a straight line of changing slope through the omitted amplitude points, because the omitted points are not incremented. For example, the next two waveforms in a series following this triangle wave might be "a--K--a" and "a--l--a", depending upon the counting sequence used. Of course, other counting sequences might increment omitted amplitude points.

Each waveform defined as a sequence of characters is then expressed as a waveform by defining the curve between the amplitude points. The simplest curve definition method is a series of points at varying amplitudes along a base axis. The next simplest curve definition method is connecting the points by straight lines. This is the definition shown in FIGS. 2,3 & 5. other curve definition methods include polynomial, sinusoidal, and curve fitting. The methods by which lines are interpolated between amplitude points will be well-known to one skilled in the art. See, for example, *Numerical Recipes,* by Press, Flannery, Tenkolsky and Vetterling, and *Elementary Numerical Analysis,* by Conte and de Boor.

In an important application of the present invention, it is possible to generate a waveform series between two given waveforms. This embodiment has particular application to the testing of waveform monitoring devices. It is known that a monitor may respond appropriately to a particular waveform (which for convenience shall be referred to as the "alpha waveform") but respond inappropriately to another waveform (the "omega" waveform) which is similar to the alpha waveform. It would be advantageous to send a series of simulated waveforms to the monitor, where the series begins with the alpha waveform and transitions to the ending omega waveform. The monitor's response to each waveform in the series can be observed, and in particular it can be noted at which waveform the monitor's response becomes inappropriate. More than one series can be sent to the monitor, each series using a different counting sequence. Through this method, the monitor's error can be diagnosed.

In this application, the definitions of the alpha and omega waveforms are known, either because the waveform definitions previously were generated by the method of the present invention or because the waveform definitions were derived by inspection of the given waveforms. Knowing the beginning and ending waveform definitions a particular counting sequence may be defined to cause the generated series to transition from the alpha waveform definition to the omega waveform definition. For example, it may be observed that incrementing the alpha definition by the conventional counting sequence using ten unit increments will produce the omega definition within an acceptable number of increments. As another example, it may be observed that incrementing the alpha definition by dividing the definition by a certain number and then adding in another number will produce the omega definition within an acceptable number on increments. As the user becomes more familiar with the method of the present invention it will be easier for the user to devise a counting sequence to generate a series which transitions from an alpha waveform to an omega waveform.

In the preferred embodiment, a waveform definition series generated by the method described above and expressed as a waveform is displayed. In the preferred embodiment a series of waveforms are displayed in rows so that the waveform series is read like a book—left to right and top to bottom. A book of waveform series may be provided to each signal simulator user.

The user is able to visually scan the book of waveforms and select desired waveforms. The user is able to tell the signal simulator manufacturer each waveform that has been selected by reference to the page, row and column at which the waveform is located.

The manufacturer, having the defined waveform, converts the definition directly to a digital representation, normalizing the waveform in the process. The manufacturer then places the digitized waveform in non-volatile memory.

In an alternate embodiment of the invention, the waveform series generation may be used interactively by the user, without the manufacturer. In this embodiment, the signal simulator is integrated with a central processing unit (CPU), such as a personal computer.

Figure 4:
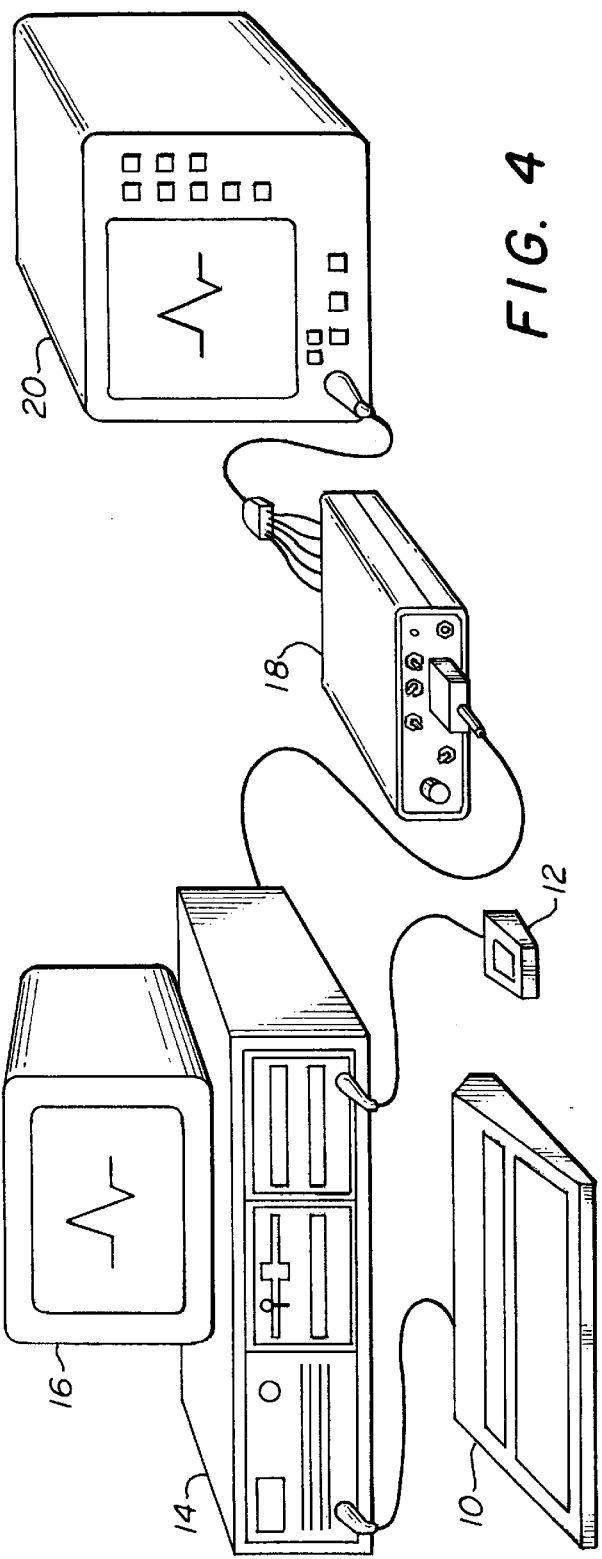
FIG. 4 is plan view of the apparatus of the interactive waveform generation system.

FIG. 4 shows a plan view of the apparatus of this embodiment. Keyboard 10 and mouse 12 are connected to CPU 14 by standard connectors as shown. Display 16 is connected to CPU 14 by standard connectors (not shown). CPU 14 and simulator 18 are connected by a standard cable from the serial or parallel port of CPU 14 to the input port of simulator 18. Simulator 18 in turn is connected to monitor 20 by standard connectors which are well-known to those skilled in the art. CPU 14, simulator 18 and monitor 20 all are connected to power supplies (not shown). In the preferred embodiment CPU 14 is the Compaq SLT-286 personal computer, and simulator 18 is the Fogg System Company Model 310 simulator.

Simulator 18 is a common commercially available simulator. Simulators presently in use may be adapted for use with the present invention with minimal difficulty. The Fogg System Company Model 310 simulator of the preferred embodiment may require modification to make signals from CPU 14 emulate the non-volatile memory used by the standard Model 310 simulator. However, other simulators may require the addition of an input port. An alternate configuration (not shown) of the embodiment of FIG. 4 combines CPU 14 and simulator 18 into one unit.

The user enters an initial waveform by typing in the character sequence via keyboard 10. The user then selects a counting method and curve definition method either by typing predetermined selections or by highlighting the choices given in a menu provided on display 16 and then depressing a button on mouse 12. A waveform definition series then is generated. Each definition then is expressed as an analog waveform on display 16.

The user is able to display up to one screen of waveforms at a time. The user may select a waveform either by typing the row and column of the waveform or by highlighting the waveform and depressing a button on mouse 12. The definition of each selected waveform is placed in volatile memory, such as RAM, associated with CPU 14.

When all desired waveforms have been selected, the user may order and combine the selected waveforms to produce a single waveform, or a group or series of waveforms. The corresponding waveform definitions are ordered and combined in the volatile memory of CPU 14.

The user then enters the command to send the waveform signal to the monitor to be tested or calibrated. The waveform definition in the volatile memory of CPU 14 is processed to produce a desired waveform by the selected curve definition method and the analog waveform is digitized.

The digitized waveform then is sent from CPU 14 via an output port to simulator 18 via an input port. The digitized waveform is processed by simulator 18 as if the digitized waveform had been in the non-volatile memory of simulator 18. This process is well-known in the art. Simulator 18 then produces a waveform signal that is used to test or calibrate monitor 20. A waveform or waveform group may be repeated in order to simulate a rhythm or pattern.

It will be appreciated that by combining the CPU and simulator in the alternate embodiment the waveform produced by applying a curve definition method to a waveform definition can be sent directly to the monitor from the CPU/simulator.

I claim:

1. A method of generating electrical signals representative of a series of waveform definitions, each waveform definition comprising an amplitude value at each base position in a set of base positions, comprising the steps of:
   (a) establishing an initial waveform definition by assigning an amplitude value to each base position,
   (b) establishing an end condition,
   (c) establishing counting conditions under which at least one amplitude value in a given waveform definition in said series will be incremented or decremented in dependence upon the amplitude values of said given waveform definition,
   (d) generating a next waveform definition in said series by utilizing said counting conditions to increment or decrement at least one of said amplitude values in the present waveform definition,
   (e) repeating step (d) until said end condition is met, and
   (f) generating electrical signals representative of said series of waveform definitions.

2. The method of claim 1, further comprising utilizing said counting conditions to increment or decrement a base position.

3. The method of claim 1, wherein said end condition is the generation of a predetermined waveform definition.

4. The method of claim 1, wherein said end condition is the generation of an predetermined number of waveform definitions in said series.

5. The method of claim 1, wherein said end condition is the occurrence of a predetermined end event.

6. The method of claim 1, further comprising plotting at least one waveform shape from said electrical signals representatives of at least one waveform definition in said series in a plot of amplitude versus base.

7. The method of claim 4, further comprising displaying said plot utilizing display means.

8. The method of claim 7, wherein a plurality of said waveform shapes are plotted in a plot of amplitude versus base from a plurality of waveform definitions and said waveform shapes are displayed utilizing said display means.

9. The method of claim 6, further comprising establishing a smooth waveform shape from said waveform definition, wherein said plot includes said waveform shape.

10. The method of claim 9, wherein the step of establishing said smooth waveform shape includes utilizing a polynomial function, sinusoidal function or curve-fitting method.

11. A system for generating electrical signals representative of a series of waveform definitions, each waveform definition comprising an amplitude value at each base position in a set of base positions, the system comprising:
    (a) means for establishing an initial waveform definition,
    (b) means for establishing a waveform end condition,
    (c) counting means for incrementing or decrementing at least one amplitude value in a given waveform definition in dependence upon the amplitude values of said given waveform definition,
    (d) means for sequentially generating each waveform definition in said series by incrementing or decrementing at least one of said amplitude values in the present waveform definition under control of said counting means,
    (e) means for checking for said end condition,
    (f) repeating steps (d) and (e) until said end condition is met, and
    (g) means for receiving said generated waveform definition and generating electrical signal representations of said series of waveform definitions.

12. The system of claim 11, wherein said counting means is a microprocessor.

13. The system of claim 11, wherein said generating means is a microprocessor.

14. The system of claim 11, further comprising memory means to store at least one of said series of waveform definitions.

15. The system of claim 14, wherein said memory means is a non-volatile electronic memory device.

16. The system of claim 15, wherein said non-volatile electronic memory device is detachable from said system.

17. The system of claim 11, further comprising means to plot at least one waveform shape from at least one waveform definition in a plot of amplitude versus base.

18. The method of claim 17, further comprising means to display said plot.

19. The system of claim 11, further comprising shaping means for establishing a smooth waveform shape from said waveform definition, wherein said plot includes said waveform shape.

20. The method of claim 19, wherein said shaping means utilizes a polynomial function, sinusoidal function or curve fitting method.

21. A method of generating a series of waveforms from a series of waveform definitions, each waveform definition representing an amplitude value at each base position in a set of base positions, comprising the steps of:
    (a) establishing an initial waveform definition by assigning an amplitude value to each base position,
    (b) establishing an end condition,
    (c) establishing counting conditions under which at least one amplitude value in a given waveform definition in said series will be incremented or decremented in dependence upon the amplitude values of said given waveform definition,
    (d) generating a next waveform definition in said series by utilizing said counting conditions to increment or decrement at least one of said amplitude values in the present waveform definition,
    (e) repeating step (d) until said end condition is met,
    (f) generating electrical signals representative of said series of waveform definitions, and
    (g) providing a waveform signal simulator, said signal simulator receiving said electrical representation of said series of waveform definitions and generating said series of waveforms in response thereto.

22. The method of claim 21, further comprising utilizing said counting conditions to increment or decrement a base position.

23. The method of claim 21, wherein said end condition is the generation of a predetermined waveform definition.

24. A system for generating a series of waveforms from a series of waveform definitions, each waveform definition representing an amplitude value at each base position in a set of base positions, the system comprising:
    a computing device for generating electrical signal representations of said series of waveform definitions, said computing device including:
        means for establishing an initial waveform definition,
        means for establishing a waveform end condition,
        counting means for incrementing or decrementing at least one amplitude value in a given waveform definition in dependence upon the amplitude values of said given waveform definition,
        means for sequentially generating each waveform definition in said series by incrementing or decrementing at least one of said amplitude values in the present waveform definition under control of said counting means until a waveform definition characterized by said end condition is generated, and
    a waveform signal simulator for receiving said electrical signal representations of said series of waveform definitions from said computing device and generating said series of waveforms in response thereto.

25. The system of claim 24, wherein said computing device is a microprocessor.

26. The system of claim 24, further comprising memory means to store at least one of said series of waveform definitions.

27. The system of claim 24, further comprising means to plot at least one waveform shape from at least one waveform definition in a plot of amplitude versus base.

28. The system of claim 24, further comprising shaping means for establishing a smooth waveform shape from said waveform definition, wherein said plot includes said waveform shape.

* * * * *